United States Patent [19]

Bulmer et al.

[11] Patent Number: 4,674,829

[45] Date of Patent: Jun. 23, 1987

[54] POLARIZATION-INDEPENDENT SWITCH WITH COUPLER SPACING OPTIMIZED FOR LOW VOLTAGE OPERATION

[75] Inventors: Catherine H. Bulmer, Springfield; William K. Burns, Alexandria, both of Va.

[73] Assignee: The United States of America as represented by the Secretary of the Navy, Washington, D.C.

[21] Appl. No.: 560,472

[22] Filed: Dec. 12, 1983

[51] Int. Cl.[4] ................................................ G02B 6/10
[52] U.S. Cl. .............................. 350/96.14; 350/96.10; 350/96.13
[58] Field of Search ............... 350/96.15, 96.10, 96.11, 350/96.12, 96.13, 96.14

[56] References Cited

U.S. PATENT DOCUMENTS

| | | | |
|---|---|---|---|
| 4,012,113 | 3/1977 | Kogelink et al. | 350/96.13 |
| 4,243,295 | 1/1981 | Alferness | 350/96.14 |
| 4,533,207 | 8/1985 | Alferness | 350/96.14 |

OTHER PUBLICATIONS

"Electrooptic Guided-Wave Device for General Polarization Transformations" by Alferness, IEEE Journal of Quantum Electronics, vol. QE-17, No. 6, Jun. 1981.
"Polarization-Insensitive Integrated-Optical Switches: A New Aproach" by Tsukada et al., IEEE Journal of Quantum Electronics, vol. QE-17, No. 6, Jun. 1981.
Schmidt, R. V. and Kogelnik, H., "Electro-Optically Switched Coupler with Stepped $\Delta\beta$ reversal using Ti--Diffused $LiNbO_3$ Waveguides" Applied Physics Letters, vol. 28, No. 9, pp. 503–506.

*Primary Examiner*—William L. Sikes
*Assistant Examiner*—Akm E. Ullah
*Attorney, Agent, or Firm*—John L. Forrest; Alan P. Klein

[57] ABSTRACT

A process of fabricating an optical directional coupler switch for the TE- and TM-mode polarizations at a given wavelength. Initially, a trial set of waveguide fabrication parameters is used to fabricate a series of channel waveguide directional couplers having the same waveguide spacing and differing interaction lengths. The step is repeated for other waveguide spacings. The power splitting ratio of each directional coupler so fabricated is determined for guided light of one of the polarizations at the given wavelength. For each series of directional couplers having a respective common waveguide spacing, the arctangent of the square root of the power splitting ratio versus the interaction length is graphed and the coupling coefficient for the one polarization is found from the graph slope. The log of the coupling coefficients so determined is graphed versus the corresponding waveguide spacings. The previous three steps are repeated for guided light of the other polarization at the given wavelength. The set of waveguide fabrication parameters is varied and all the steps repeated until the desired set of parameters is arrived at for which the graphs of the log of the coupling coefficients versus the corresponding waveguide spacings for guided light of both polarization at the given wavelength coincide.

15 Claims, 12 Drawing Figures

POLARIZATION-INDEPENDENT SWITCH WITH COUPLER SPACING OPTIMIZED FOR LOW VOLTAGE OPERATION

BACKGROUND OF THE INVENTION

This invention relates in general to optical switches and more particularly, to polarization-independent optical switches suitable for use with fiber optical transmission lines.

Optical directional couplers, such as those formed by two parallel channel waveguides, are characterized by (1) the interaction length L, (2) the coupling coefficient K or the corresponding conversion length $l = \pi/2k$ indicating the minimum length required to obtain complete crossover of light from one guide to the other, and (3) the mismatch $\Delta\beta = \beta_1 - \beta_2$ between the propagation constants $\beta_1$ and $\beta_2$ of the two guides. Complete crossover is achieved when the guides are phase matched ($\Delta\beta = 0$) and when the interaction length is an exact odd multiple of the coupling length, i.e., when $L = (2v+1)l$. An optical switch can be built by electrically switching the directional coupler from the crossover state to the straight-through state where no net crossover occurs. One way to do this is by fabricating the coupler on electrooptic material and applying a voltage which induces a mismatch $\Delta\beta$ via the electrooptic effect. When the interaction length L is not made exactly equal to the coupling length l (or an odd multiple thereof), the the crossover is not complete and crosstalk results. In addition, the length l is a function of wavelength.

In reversed $\Delta\beta$ couplers the technique used to achieve complete crossover in the coupler is to provide along the interaction length two or more sections with a mismatch or asynchronism $\Delta\beta$ of alternating sign. A simple way to induce this alternating $\Delta\beta$ is to provide sectioned electrodes and apply voltages of alternating polarity along the interaction length. There is no requirement for an exact L/l ratio in this configuration, and there is always a voltage that will make the light cross over completely, and another voltage that will make the light go straight through. If the switch has to be operated at another wavelength and l is wavelength dependent, the only adjustment that seems necessary, for small wavelength changes, is a change of these voltage values.

The polarization properties of optical switches are of great importance in determining the usefulness of these devices in an optical data transfer system employing fiber transmission lines. In particular, these devices must perform efficient and complete switching of light, without regard to its state of polarization. This requirement arises because linearly polarized light coupled into single mode, circular fibers suffers a rapid conversion to other polarization states. Light coupled from a fiber is therefore expected to possess an unknown elliptical polarization and both TE- and TM-like modes will be excited in the optical circuit. Any optical switch must act in identical fashion upon each of the constituent polarizations in order to achieve suitably low interchannel crosstalk.

Alferness in Appl. Phys. Lett. 35, 748 (1979) discloses a 2×2 optical switch that, for fixed switching voltages, operates with low crosstalk independent of the polarization of the input optical signal.

The difficulty of achieving efficient switching (i.e., low channel crosstalk) for both TE and TM polarizations with the same applied voltage arises because the orthogonal modes see unequal electro-optic coefficients. As a result, for the same applied voltage, the induced phase mismatch is different for the two polarizations. In addition, because the guide-substrate refractive index difference is generally unequal for the TE and TM modes, the mode confinement and consequently the coupling coefficient K depend upon polarization. The values of K and $\Delta\beta$ together with the interaction length L determine the switching efficiency, and therefore the polarization dependence.

The device described in the Alferness reference is a reversed-$\Delta\beta$ switch with weighted coupling, i.e., varying interguide separation, designed so as to allow polarization-independent behavior. Reversed-$\Delta\beta$ type electrodes are formed over the waveguides so that voltages can be applied to achieve the required switching conditions by means of the electro-optic effect. The design requires the measurement of the coupling characteristics of singlemode channel waveguides in order to determine, for each optical polarization, the coupling coefficient as a function of coupler spacing. The coupling characteristics are dependent on the channel waveguide fabrication parameters such as the waveguide width, the thickness of the metal diffused into the electrooptic substrate to create a waveguiding region of higher refractive index than the substrate and the diffusion time, temperature and gas flow conditions. The relationship between coupling coefficient K and interguide separation d can be described approximately by the relationship for coupling between two planar waveguides:

$$K = K_o \exp(-d/\gamma)$$

where $\gamma$ is the waveguide transverse penetration depth. Both $K_o$ and $\gamma$ depend on the waveguide fabrication parameters. The Alferness reference states that $K_{TE} > K_{TM}$ for large d ($d > d_e$) and $K_{TE} < K_{TM}$ for small d ($d < d_e$), where the subscript TE refers to the TE mode polarization and TM refers to the TM mode polarization. The interguide spacing $d_e$ at which $K_{TE}$ and $K_{TM}$ intersect is determined from experimental measurements. The variable-spacing switch is then designed about this intersection point and the waveguide fabrication conditions which resulted in $d = d_e$ for $K_{TE} = K_{TM}$ must be replicated when the switch is fabricated. The waveguide spacing in the switch is determined by $d_e$ and, since the electrodes lie on top of the waveguides, the electrode spacing g is also dependent on $d_e$. Hence, the switching voltage is determined by $d_e$. The electrode spacing cannot be varied in order to optimize the switching voltage but is restricted to a value dependent on the different variations of $K_{TE}$ and $K_{TM}$ with d.

SUMMARY OF THE INVENTION

It is therefore one obJect of this invention to fabricate a polarization-independent optical directional coupler switch.

It is another object to fabricate a polarization-independent optical directional coupler switch for which any choice of waveguide spacing can be made in order to minimize the switching voltage.

The obJects of the invention are achieved in one aspect by an improvement in a process of fabricating an optical directional coupler switch for the TE- and TM-mode polarizations at a given wavelength. The switch comprises a pair of channel waveguides embedded in an electrooptic substrate of lower refractive index. The improvement resides in the step of determining particular waveguide fabrication parameters for which the TE- and TM-mode coupling coefficients are equal for any waveguide spacing.

In another aspect the invention involves the optical directional coupler switch fabricated by the inventive process.

The ability to achieve equal coupling coefficients for the TE- and TM-modes permits the successful design and operation of a polarization-insensitive optical directional coupler switch which can function effectively for light containing both polarizations. The waveguide spacing and, the electrode spacing which depends on the waveguide spacing, can be varied in order to optimize the switching voltage, since the polarization-insensitivity is independent of waveguide spacing. Thus, reduced switching voltages can be obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION

Figure 1:
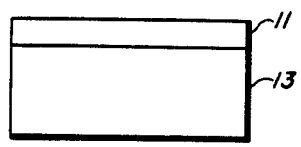
FIGS. 1–4 show the structural changes following various steps in the prior art process of fabricating an optical directional coupler switch.

Referring to the schematic structures of FIGS. 1–4, a process of fabricating an optical directional coupler switch for the TE- and TM-mode polarizations at a given wavelength includes a first step, shown in FIG. 1, in which a film 11, of material of thickness t is laid down on an electrooptic substrate 13.

Figure 2:
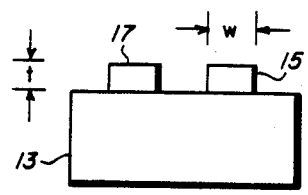

In the second step, shown in FIG. 2, a pair of parallel strips 15 and 17, each of width w, is defined in the film, with a photolithographic mask, for example.

Figure 3:
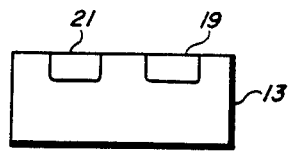

Next, as shown in FIG. 3, the third step is performed, whereby the pair of strips 15 and 17 is diffused into the substrate 13 at a temperature T for h hours to form a pair of channel waveguides 19 and 21.

Figure 4:
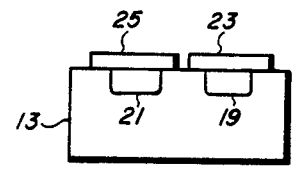

In the fourth step, shown in FIG. 4, means 23, 25 are formed over the channel waveguides 19 and 21 for impressing voltages across selected parts of the waveguides.

The process to this point has been disclosed in the art and has been in common use for some time and consequently the description has not been detailed. There are numerous alternatives to arriving at the same general completed device with steps rearranged and/or other steps or materials added or deleted.

The resulting optical directional coupler switch is polarization-dependent. That is, its switching voltages depend on the polarization state of the light in the switch, e.g., TE or TM.

In the subject invention, prior to the first step, particular waveguide fabrication parameters (waveguide thickness and width before diffusion, diffusion temperature and time) are determined for the given wavelength so that in the resulting switch the TE- and TM-mode coupling coefficients are equal, no matter what the spacing between the waveguides. This design can then be used to fabricate a polarization-independent switch in which the waveguide spacing is not fixed by the switch design. The waveguide spacing can be chosen, for example, to reduce voltage. The polarization-independent switch can then switch either polarization of light for the same set of operating conditions.

Parameter Determining Procedure

The waveguide-fabrication parameter-determining procedure of the invention comprises seven steps, which will hereinafter be designated steps (a) through (g).

The first step (a) is using a trial set of waveguide fabrication parameters (waveguide thickness t and width w before diffusion, diffusion temperature T and diffusion time h) to fabricate a series of channel waveguide directional couplers having the same waveguide spacing d and differing interaction lengths L.

The second step (b) is repeating step (a) for other waveguide spacings.

Figure 5:
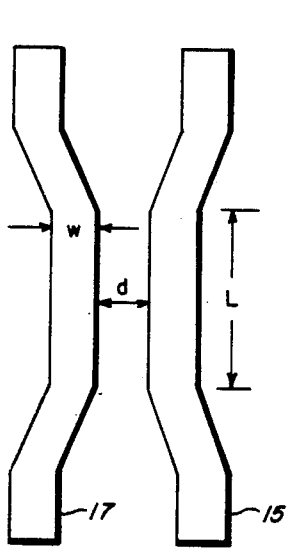
FIG. 5 shows an exemplary coupler pattern.

While steps (a) and (b) may take a variety of forms, conveniently they may take the form of preparing a photolithographic mask containing many directional couplers (one such coupler pattern being shown in FIG. 5) with the values of waveguide spacing d varying from 1 to 10 μm, for example, and the value of interaction length L varying from 1 to 10 mm, for example. The film is laid down on an electrooptic substrate; the photolithography is carried out; and the patterned film is diffused into the underlying substrate.

Shown below in the Table are two sets of waveguide fabrication parameters which have been determined experimentally to provide equal TE- and TM-mode coupling coefficients, independent of waveguide spacing, for titanium channel waveguides embedded in a lithium niobate substrate. Either one of these sets of parameters may be used as the trial set of waveguide fabrication parameters.

TABLE

| Wavelength (μm) | t (Å) | w (mm) | T (°C.) | h (hr) |
|---|---|---|---|---|
| 0.83 | 270 | 3.0 | 1000 | 6 |
| 1.3 | 350 | 6.1 | 1050 | 6 |

Figure 6:
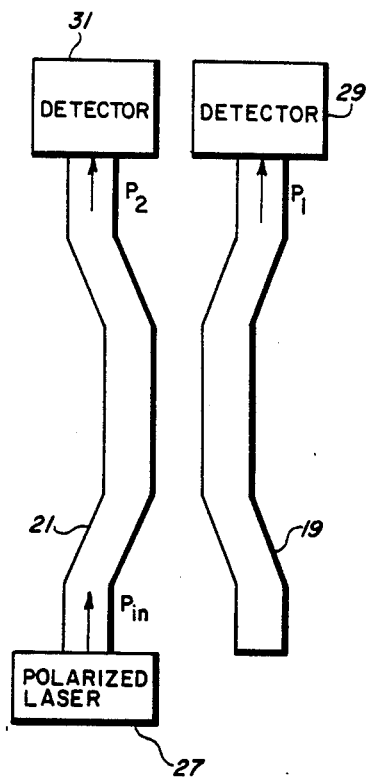
FIG. 6 is a diagram showing the output of a polarized laser aligned on one of the channel waveguides and detectors measuring the splitting of the laser output by the coupler.

The third step, step (c) is determining the power splitting ratio $(P_1/P_2)$ of each directional coupler fabricated in steps (a) and (b) for guided light of one of the polarizations at the given wavelength. While step (c) may take a variety of forms, conveniently it may take the form shown in FIG. 6 of aligning the output of a polarized laser 27 on one of the channel waveguides 19 and 21 and measuring the splitting of the laser output by the coupler by means of detectors 29 and 31.

Figure 7:
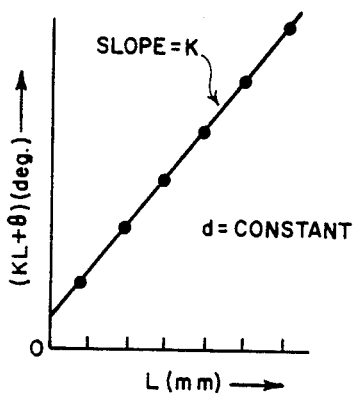
FIG. 7 shows a graph of $(KL+\theta)$ versus L with d constant.

The fourth step (d) is graphing, for each series of directional couplers fabricated in steps (a) and (b) and having a respective common waveguide spacing d, the arctangent of the square root of the power splitting ratio versus the interaction length and finding the coupling coefficient for the one polarization from the slope of the graph. Since it may be shown that the following relationship holds $$\tan^{-1}\left[\left(\frac{P_1}{P_2}\right)^{\frac{1}{2}}\right] = (KL + \theta),$$

where K is the coupling coefficient and $\theta$ is a constant, K can be determined for each value of d by extracting the slope of the graph, as shown in FIG. 7.

Figure 8:
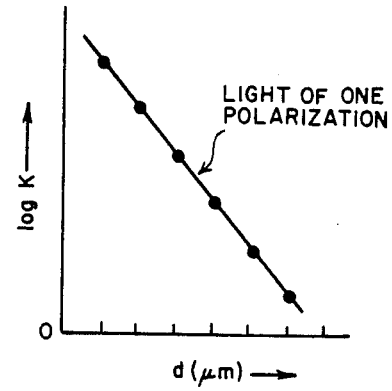
FIG. 8 shows a graph of log K versus d for one polarization.

The fifth step (e) is graphing the log of the coupling coefficients found in step (d) versus the corresponding waveguide spacings, as shown in FIG. 8.

The sixth step (f) is repeating steps (c)–(e) for guided light of the other polarization at the given wavelength.

The final step (g) is varying the set of waveguide fabrication parameters and repeating steps (a) through (f) until the desired set of waveguide fabrication parameters is arrived at for which the graphs of the log of the coupling coefficients versus the corresponding waveguide spacings for guided light of both polarizations at the given wavelength coincide.

Figure 9:
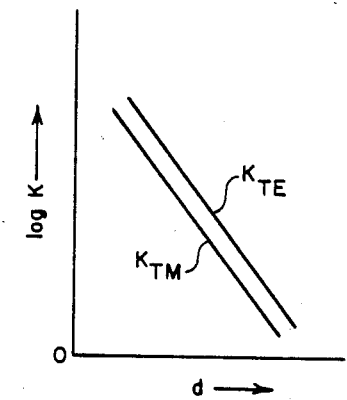
FIGS. 9–12 shows graphs of log K versus d for both polarizations.

If, as shown in FIG. 9, the graphs of the log of the coupling coefficients versus the corresponding waveguide spacings for guided light of both polarizations at the given wavelength do not coincide and the graph for the TE-mode polarization lies above and has the same negative slope as the graph for the TM-mode polarization, choose smaller values for the waveguide thickness and/or width before diffusion and repeat the process. Hold the diffusion temperature and time constant.

Figure 10:
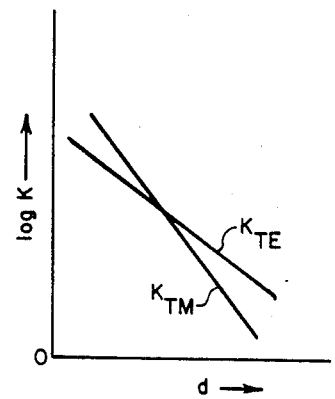

If, as shown in FIG. 10, the graphs of the log of the coupling coefficients versus the corresponding waveguide spacings for guided light of both polarizations at the given wavelength do not coincide and the graph for the TM-mode polarization has a larger negative slope than the graph for the TE-mode polarization, choose smaller values for the waveguide thickness and/or width before diffusion and repeat the process. Hold the diffusion temperature and time constant.

Figure 11:
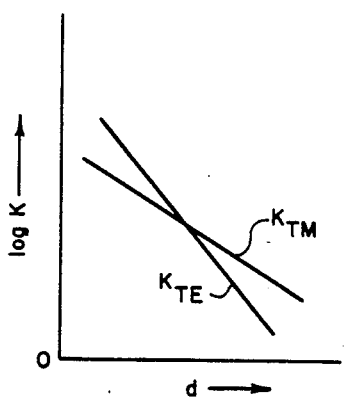

If, as shown in FIG. 11, the graphs of the log of the coupling coefficients versus the corresponding waveguide spacings for guided light of both polarizations at the given wavelength do not coincide and the graph for the TE-mode polarization has a larger negative slope than the graph for the TM-mode polarization, choose larger values for the waveguide thickness and/or width before diffusion and repeat the process. Hold the diffusion temperature and time constant.

Figure 12:
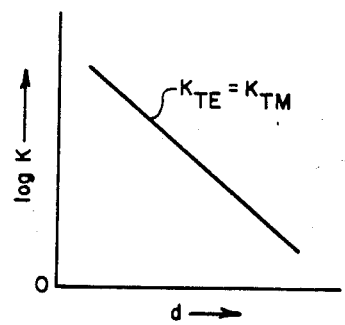

If, as shown in FIG. 12, the graphs of the log of the coupling coefficients versus the corresponding waveguide spacings for guided light of both polarizations at the given wavelength coincide, stop. The desired set of waveguide fabrication parameters has been arrived at for which the TE- and TM-coupling coefficients are equal for any waveguide spacing of interest.

There has thus been disclosed a procedure for determining a set of fabrication conditions for optical directional coupler switches, whose use results inthe coupling coefficients for the TE- and TM-modes being equal for any waveguide spacing of interest, so that a polarization-independent switch can be constructed for which any choice of waveguide spacing may be made in order to minimize the switching voltage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a process of fabricating an optical directional coupler switch for the TE- and TM-mode polarizations at a given wavelength, comprising a pair of channel waveguides embedded in an electropotic substrate of low refractive index, the improvement comprising:
   (a) using a trial set of waveguide fabrication parameters to fabricate a series of channel waveguide direction couplers having the same waveguide spacing a differing interaction lengths;
   (b) repeating step (a) for other waveguide spacings;
   (c) determining the power splitting ratio of each directional coupler fabricated in steps (a) and (b) for guided light of one of the polarizations at the given wavelength;
   (d) for each series of directional couplers fabricated in steps (a) and (b) and having a respective common waveguide spacing, graphing the arctangent of the square root of the power splitting ratio versus the interaction length and finding the coupling coefficient for the one polarization from the slope of the graph;
   (e) graphing the log of the coupling coefficients found in step (d) versus the corresponding waveguide spacings;
   (f) repeating steps (c)–(e) for guided light of the other polarization at the given wavelength;
   (g) varying the set of waveguide fabrication parameters and repeating steps (a)–(f) until the desired set of waveguide fabrication parameters is arrived at for which the graphs of the log of the coupling coefficients versus the corresponding waveguide spacing for guided light of both polarizations at the given wavelength coincide; and
   (h) producing the coupler switch according to the desired set of waveguide fabrication parameters of set (g).

2. The process recited in claim 1 wherein step (g) includes:
   choosing smaller values for the waveguide thickness before diffusion, and repeating steps (a)–(f) if the graphs of the log of the coupling coefficients versus the corresponding waveguide spacings for guided light of both polarizations at the given wavelength do not coincide and the graph for the TE-mode polarization lies above and has the same negative slope as the graph for the TM-mode polarization.

3. The process recited in claim 1, wherein step (g) includes:
   choosing smaller values for the waveguide width before diffusion, and repeating steps (a)–(f) if the graphs of the log of the coupling coefficients versus the corresponding waveguide spacings for guided light of both polarizations at the given wavelength do not coincide and the graph for the TE-mode polarization lies above and has the same negative slope as the graph for the TM-mode polarization.

4. The process recited in claim 1 wherein step (g) includes:
   choosing smaller values for the waveguide thickness and width before diffusion, and repeating steps (a)–(f) if the graphs of the log of the coupling coefficients versus the corresponding waveguide spacings for guided light of both polarizations at the given wavelength do not coincide and the graph for the TE-mode polarization lies above and has the same negative slope as the graph for the TM-mode polarization.

5. The process recited in claim 1 wherein step (g) includes:
choosing smaller values for the waveguide thickness before diffusion, and repeating steps (a)–(f) if the graphs of the log of the coupling coefficients versus the corresponding waveguide spacings for guided light of both polarizations at the given wavelength do not coincide and the graph for the TM-mode polarization has a larger negative slope than the graph for the TE-mode polarization.

6. The process recited in claim 1 wherein step (g) includes:
choosing smaller values for the waveguide width before diffusion, and repeating steps (a)–(f) if the graphs of the log of the coupling coefficients versus the corresponding waveguide spacings for guided light of both polarizations at the given wavelength do not coincide and the graph for the TM-mode polarization has a larger negative slope than the graph for the TE-mode polarization.

7. The process recited in claim 1 wherein step (g) includes:
choosing smaller values for the waveguide thickness and width before diffusion, and repeating steps (a)–(f) if the graphs of the log of the coupling coefficients versus the corresponding waveguide spacings for guided light of both polarizations at the given wavelength do not coincide and the graph for the TM-mode polarization has a larger negative slope than the graph for the TE-mode polarization.

8. The process recited in claim 1 wherein step (g) includes:
choosing larger values for the waveguide thickness before diffusion, and repeating steps (a)–(f) if the graphs of the log of the coupling coefficients versus the corresponding waveguide spacings for guided light of both polarizations at the given wavelength do not coincide and the graph for the TE-mode polarization has a larger negative slope than the graph for the TM-mode polarization.

9. The process recited in claim 1 wherein step (g) includes:
choosing larger values for the waveguide width before diffusion, and repeating steps (a)–(f) if the graphs of the log of the coupling coefficients versus the corresponding waveguide spacings for guided light of both polarizations at the given wavelength do not coincide and the graph for the TE-mode polarization has a larger negative slope than the graph for the TM-mode polarization.

10. The process recited in claim 1 wherein step (g) includes:
choosing larger values for the waveguide thickness and width before diffusion, and repeating steps (a)–(f) if the graphs of the log of the coupling coefficients versus the corresponding waveguide spacings for guided light of both polarizations at the given wavelength do not coincide and the graph for the TE-mode polarization has a larger negative slope than the graph for the TM-mode polarization.

11. A process of fabricating an optical directional coupler switch for the TE- and TM-mode polarizations at 0.83 $\mu$m wavelength having equal TE- and TM-mode coupling coefficients for any waveguide spacing, comprising the steps of:
laying down a titanium film of thickess 270 angstroms on the top surface of a lithium niobate substrate;
defining in the film a pair of parallel strips of width 3.0 $\mu$m;
diffusing the pair of strips into the substrate at 1000° C. for 6 hours to form a pair of channel waveguides; and
forming means over the channel waveguides for impressing voltages across selected parts of the waveguides.

12. The optical directional coupler switch for the TE- and TM-mode polarizations at 0.83 $\mu$m wavelength having equal TE- and TM-mode coupling coefficients for any waveguide spacing, fabricated by the process of claim 11.

13. A process of fabricating an optical directional coupler switch for the TE- and TM-mode polarizations at 1.3 $\mu$m wavelength having equal TE- and TM-mode coupling coefficients for any waveguide spacing, comprising the steps of:
laying down a titanium film of thickness 350 angstroms on the top surface of a lithium niobate substrate;
defining in the film a pair of parallel strips of width 6.1 $\mu$m;
diffusing the pair of strips into the substrate at 1050° C. for 6 hours to form a pair of channel waveguides; and
forming means over the channel waveguides for impressing voltages across selected parts of the waveguides.

14. The optical directional coupler switch for the TE- and TM-mode polarizations at 1.3 $\mu$m wavelength having equal TE- and TM-mode coupling coeffecents for any waveguide spacing, fabricated by the process of claim 13.

15. An optical directional coupler switch for the TE- and TM-mode polarizations at a given wavelength comprising:
a pair of channel waveguides embedded in an electrooptic substrate of lower refractive index: and
means for impressing voltages across selected parts of the waveguides;
characterized in that:
the waveguide parameters are such that the resulting TE- and TM-mode coupling coefficients are equal for any waveguide spacing.

* * * * *